United States Patent
Wojan et al.

(10) Patent No.: US 6,561,209 B2
(45) Date of Patent: May 13, 2003

(54) AUTOMOTIVE WASHER SYSTEM WITH A PURGE APPARATUS AND A METHOD THEREFORE

(75) Inventors: Scott Wojan, Novi, MI (US); Michael Lewis Greenfield, Ann Arbor, MI (US); Timothy John Wallington, Ann Arbor, MI (US); Edward Karl Krause, Ann Arbor, MI (US)

(73) Assignee: Ford Global Technologies, L.L.C., Dearborn, MI (US)

( * ) Notice: Subject to any disclaimer, the term of this patent is extended or adjusted under 35 U.S.C. 154(b) by 111 days.

(21) Appl. No.: 09/946,445

(22) Filed: Sep. 5, 2001

(65) Prior Publication Data
US 2003/0041900 A1 Mar. 6, 2003

(51) Int. Cl.[7] .............................................. F16K 17/38
(52) U.S. Cl. ...................... 137/79; 15/250.01; 239/110; 239/284.1
(58) Field of Search ................ 137/79, 351; 15/250.01; 239/104, 106, 110, 284.1

(56) References Cited

U.S. PATENT DOCUMENTS

| 3,633,827 A | * | 1/1972 | Novak ..................... 239/284.1 |
| 3,901,444 A | * | 8/1975 | Maltbie et al. ............. 239/112 |
| 4,331,295 A | * | 5/1982 | Warihashi ................ 239/284.1 |
| 4,441,463 A | | 4/1984 | Rest et al. |
| 5,261,254 A | | 11/1993 | Cattane |
| 5,327,613 A | | 7/1994 | Ohtsu |
| 5,561,882 A | | 10/1996 | Eustache et al. |
| 5,649,587 A | | 7/1997 | Plant |
| 5,669,986 A | | 9/1997 | Buchanan, Jr. et al. |
| 5,797,159 A | | 8/1998 | Berge et al. |
| 5,946,763 A | | 9/1999 | Egner-Walter et al. |

* cited by examiner

Primary Examiner—John Fox
(74) Attorney, Agent, or Firm—Gigette M. Bejin (57) ABSTRACT

A washer system and a method are provided for purging the washer liquids contained within a washer system. A first reservoir 21 containing a freezable washer liquid 40, a second reservoir 23 containing a freeze-resistant washer liquid 48, and an exit circuit 28 are fluidically coupled to a fluid distribution circuit 26. A fluid purge apparatus 61 is also coupled to the fluid distribution circuit 26. An electronic control module (ECM) 20 is electrically coupled to the fluid distribution circuit 26, the fluid purge apparatus 61 and a temperature sensor 86. The ECM 20 controls the fluid purge apparatus 61 upon receiving a temperature signal from the temperature sensor 86. The fluid purging apparatus 61 purges freezable washer liquid 40 from a portion of the fluid distribution circuit 26, during temperatures at or below a predetermined temperature, to prevent the washer liquid from freezing within the fluid distribution circuit.

27 Claims, 4 Drawing Sheets

AUTOMOTIVE WASHER SYSTEM WITH A PURGE APPARATUS AND A METHOD THEREFORE

TECHNICAL FIELD

The present invention relates generally to a washer system particularly suited for automotive vehicles and more particularly, to a method and an apparatus for purging at least a portion of the washer system.

BACKGROUND OF THE INVENTION

Currently, most washer liquids contain volatile organic compounds (VOCs), such as alcohols or glycols, to depress the overall washer liquid freezing point temperature. The most common washer liquid is a solution of methyl alcohol (methanol) by weight in demineralized water, including a small amount of detergent and dye.

After having been dispensed onto the vehicle surface to be cleaned, the volatile organic compounds contained in the washer liquid can evaporate into the atmosphere. With sufficient atmospheric warmth and sunlight, such as during a hot and sunny day, certain VOCs, including those used as freezing point depression agents in washer liquid, may participate in a complex series of photochemical reactions in the atmosphere leading to the formation of ozone, a major component of smog (air pollution). For this reason, many governments have placed limits on total allowable vehicular VOC emissions, primarily with respect to engine exhaust and fuel delivery systems. As regulations become increasingly restrictive, VOC emissions from washer systems may be counted against total vehicular VOC emissions, though this currently is not the case.

Although reduction of VOC emissions is not addressed, U.S. Pat. No. 5,261,254 uses water extracted from the air in its washer system. The '254 patent is a windshield washer system that contains three separate reservoirs. One reservoir is used to collect water from the air. Another reservoir is used to hold an anti-freeze solution. Finally, the third reservoir is used to combine the water extracted from the air with the anti-freeze solution creating a freeze-resistant washer liquid.

U.S. Pat. No 5,946,763 is a windshield washer system that also contains three reservoirs, although the reduction of VOC emissions is again not addressed. One reservoir contains collected rainwater. A second reservoir contains anti-freeze solution. A third reservoir contains a strong cleaning agent. According to the level of freeze protection needed, the anti-freeze solution is pumped into the tank holding the rainwater to create a washer liquid that is freeze-resistant. The '763 patent describes a method of mixing the rainwater with the anti-freeze upon determining the outside temperature, the washer liquid temperature, and the density of the washer liquid. Both the '763 and '254 patents transfer liquids from one reservoir to another and to the spray nozzles via a pump, a pump in combination with tubing, or via gravity. Both patents provide a single reservoir and pump assembly that is used to hold and distribute the washer liquid to the vehicle surface to be cleaned. In addition, both patents describe situations when water will be distributed throughout various reservoirs, pumps, tubing, passages and nozzles. When the temperature drops below the freezing point of water (0° C.), some of these components may freeze shut, thereby disabling the washer systems. Although the '763 patent describes a method of creating an ideal freezing point solution, it uses signals from several sensors in determining when to add anti-freeze to the washer liquid. The '763 patent uses a sensor to measure temperature of the washer liquid, a sensor for measuring the outside temperature, and a sensor for measuring the density of the washer liquid. The use of three sensors and various other components causes the '763 patent to be relatively complex and costly to produce.

Disadvantages associated with the systems disclosed in the '763 and '254 patents include freezing in the portion of the washer system that distributes washer liquid, when the washer liquid therein has a freezing point greater than or equal to the surrounding temperature. In addition, since only one washer liquid reservoir and pump assembly is provided, once the water is mixed with the anti-freeze solution to form the washer liquid, the only washer liquid option available is a freeze-resistant mixture. When outside temperatures transition to a level where ozone formation is possible, such as from a cold day or region to a hot day or region, the freeze-resistant mixture is still used, thereby emitting VOCs that are known contributors to ozone and smog formation.

It would therefore be desirable to provide a washer system that dispenses a washer liquid that emits a reduced amount of VOCs over conventional washer systems and that does not become inoperative due to freezing of the washer liquid.

SUMMARY OF THE INVENTION

One object of the invention is to reduce the amount of VOC emissions from the washer system of an automotive vehicle. Another object of the invention is to provide a washer system that purges at least a portion of the fluid distribution circuit of the washer system before there is a chance of freezing.

In one aspect of the invention, a washer system includes a first reservoir containing a washer liquid that may freeze at or below 0° C., such as a solution of soap and water, a second reservoir containing a freeze-resistant washer liquid, such as a solution of water, alcohol and soap, and an exit circuit. The first reservoir, second reservoir, and exit circuit are fluidically coupled to a fluid distribution circuit. A fluid purge apparatus is also fluidically coupled to the fluid distribution circuit. An electronic control module (ECM) is electrically coupled to the fluid distribution circuit, the fluid purge apparatus, and a temperature sensor. The ECM controlling the fluid purge apparatus purges at least a portion of the fluid distribution circuit and the exit circuit upon receiving a temperature signal from the temperature sensor indicative of a potential for freezing. The fluid purge apparatus is used to prevent freezing, in the portion of the washer system that distributes fluid, when the temperatures are low enough to cause freezing.

Another aspect of the invention contemplates a method of operating a washer system having a first reservoir containing a freezable washer liquid, a second reservoir containing a freeze-resistant washer liquid, and a fluid purge apparatus. The ECM determines a temperature and purges the fluid from at least a portion of a fluid distribution circuit and an exit circuit in response to the temperature.

One embodiment of the present invention permits freezing of the freezable washer liquid and use of the freeze-resistant washer liquid only during temperatures below a predetermined temperature. In addition, taking into consideration space constraints, at least a portion of this embodiment may be incorporated into a fan shroud assembly.

One advantage of the invention is that the washer system reduces the amount of emitted VOCs over prior known systems while preventing the system from being disabled by freezing temperatures.

The present invention itself, together with further objects and attendant advantages, is best understood by reference to the following detailed description, taken in conjunction with the accompanying drawings.

DETAILED DESCRIPTION OF THE PREFERRED EMBODIMENT

In each of the following figures, the same reference numerals are used to refer to the same components. While the present invention is described with respect to an automotive washer system, the following washer systems are also capable of being adapted for washing other surfaces and are not limited to the following automotive applications: a windshield washer system, a head lamp or tail lamp washer system, and a washer system for the rear window in a vehicle.

Figure 1:
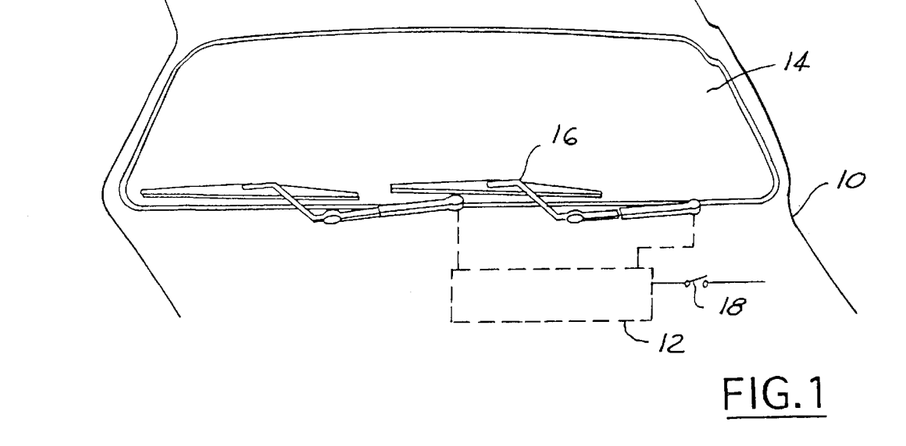
FIG. 1 is a perspective view of an automotive vehicle having a washer system according to the present invention.

Referring to FIG. 1, a perspective view of an automotive vehicle 10 having a washer system 12 according to the present invention is illustrated. Automotive vehicle 10 has a windshield 14 and wiper blades 16. A command switch 18 is located within vehicle 10. Actuating the command switch 18 causes the washer system 12 to pump washer liquid onto the windshield 14 and at the same time actuate the wiper blades 16 by powering a wiper motor (not shown). This in turn washes and cleans the windshield 14 (or other surfaces) on the vehicle 10. The command switch 18 may be of any style commonly used for a washer system in an automotive vehicle, such as stalk-mounted, console-mounted, or instrument panel-mounted.

Figures 2, 6B:
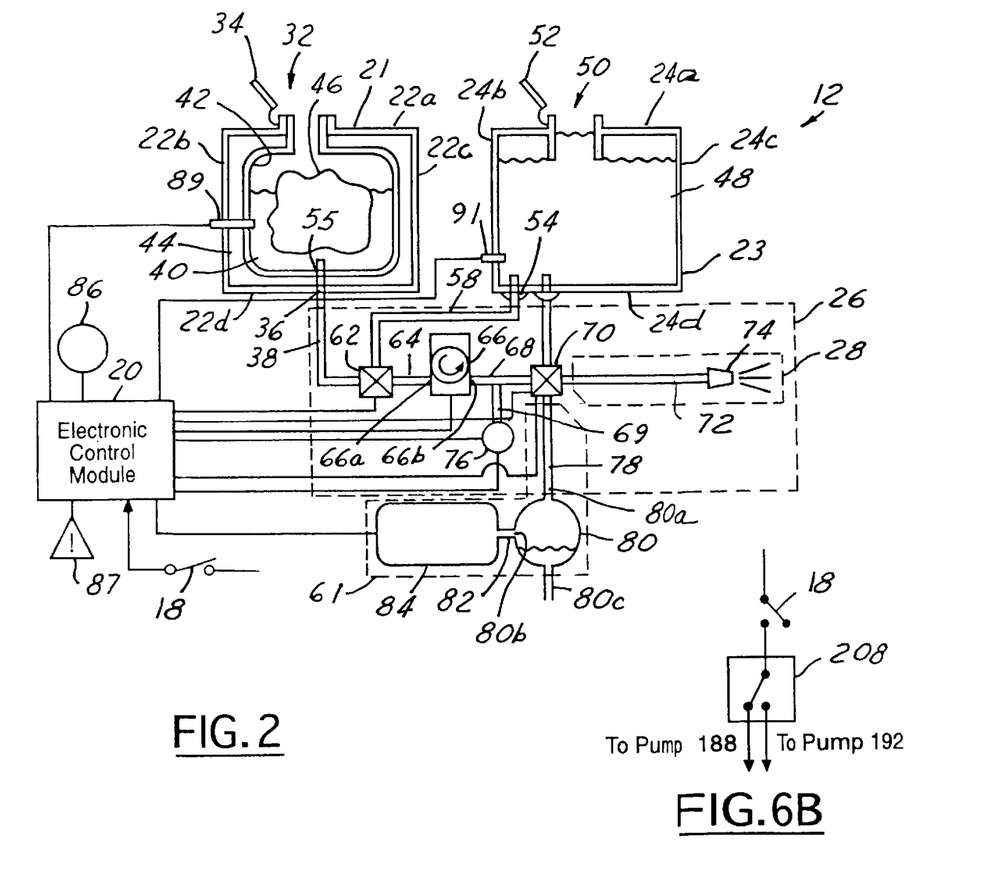
FIG. 2 is a schematic view of the first washer system according to the preferred embodiment.
FIG. 6B is a schematic view of a thermostat switch that may be used in the third washer system shown in FIG. 6A.

Referring now to FIG. 2, a first embodiment of the washer system 12 is shown. The washer system 12 has a first reservoir 21, a second reservoir 23, and a fluid distribution circuit 26. The fluid distribution circuit 26 directs washer liquid from either the first reservoir 21 or the second reservoir 23 to an exit circuit 28 where washer liquid is dispensed. The exit circuit 28 directs washer liquid to a surface to be washed, such as the windshield 14 of FIG. 1. The electronic control module (ECM) 20 determines whether to use the washer liquid in the first reservoir 21 or the second reservoir 23. The ECM 20 may comprise analog or digital logic control devices or may be microprocessor based. Upon determining which washer liquid to use, the ECM 20 controls the fluid distribution circuit 26, directing the appropriate washer liquid through the exit circuit 28 and onto the windshield 14. When the command switch 18 is closed, the ECM 20 generates a command signal to activate the washer system 12, such that the system mode is equal to "activate". After the command switch 18 is opened, the ECM 20 discontinues the command signal, such that the system mode equals "deactivate".

The first reservoir 21 is illustrated as having six sides 22, similar to a cube (top side 22a, left side 22b, right side 22c, and bottom side 22d are shown). Of course, other shapes and irregular shapes may be used due to packaging constraints in the vehicle. The first reservoir 21 has a filling hole 32 in the top side 22a with a removable lid 34. The bottom side 22d has an opening 36 to which a drain tube 38 may be connected. The first reservoir 21 contains a freezable washer liquid 40, such as a solution of soap and water, that has a freezing point temperature similar to pure water. The reservoir 21 is designed to hold the freezable washer liquid 40 in the liquid state and in the higher volume solid state. A water-based liquid solution may expand up to about 10% by volume when transforming from a liquid state to a solid state. To compensate for the higher volume, the first reservoir 21 may contain an expandable bladder 42 at least partially surrounded by foam 44. The expandable bladder 42 is designed to expand up to the inner volume of the first reservoir 21 minus the volume of the isolation foam 44 surrounding the bladder 42, upon compression of said foam. The foam 44 or similar compressible material isolates and locates the bladder 42 within the first reservoir 21 and allows for the expansion of the water-based liquid 40 without generating significant strain on the sides 22 of reservoir 21, thus preventing fracturing of the sides 22. The foam 44 also prevents the bladder 42, and any solid or liquid contained there within, from swinging freely and striking the sides 22 of reservoir 21 during vehicle movement, thus mitigating a potential source of noise. Of course, other known methods for compensation of ice formation would be evident to those skilled in the art, including the use of an expansion resilient plastic reservoir.

The second reservoir 23 also is illustrated as having six sides 24, similar to a cube (top side 24a, left side 24b, right side 24c, and the bottom side 24d are shown). As mentioned above, other shapes may be used. The second reservoir 23 contains a freeze-resistant washer liquid 48, such as a solution of water, alcohol (VOC) and soap. The second reservoir 23 also has a filling hole 50 through top side 24a with a removable lid 52. The bottom side 24d has a drain tube 58 that protrudes through a seal 54.

Figures 2A, 2B:
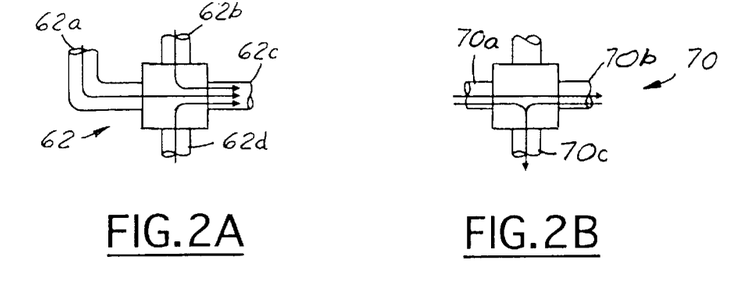

Referring now to FIGS. 2, 2A, and 2B, the fluid distribution circuit 26 is fluidically connected to the first reservoir 21, second reservoir 23 and a fluid purge apparatus 61, and is electrically connected to the ECM 20. The three operative components of the fluid distribution circuit 26 include a first dual-purpose valve 62, a pump 66, and a second dual purpose valve 70 that are coupled in series. "Dual-purpose" refers to the capability of drawing washer liquid or gas (air) into the fluid distribution circuit 26. The first dual-purpose valve 62 is preferably a solenoid actuated valve with selectable opening of four flow ports 62a, 62b, 62c and 62d, as best shown in FIG. 2A. Unless selectively energized to open, each of the flow ports 62a, 62b, 62c and 62d is normally closed.

The pump 66 is a liquid pump with an inlet side 66a and an outlet side 66b. The pump 66 may be of the type and size suitable for the particular application. The second dual-purpose valve 70 is preferably a solenoid actuated valve with selectable opening of three flow ports 70a, 70b and 70c, as best shown in FIG. 2B. Unless selectively energized to open, each of the flow ports 70a, 70b and 70c is normally closed. The fluid distribution circuit 26 also includes a number of fluid connections such as: fluid drain tube 38, fluid drain tube 58, fluid passage tube 64, fluid passage tube 68, and an exit circuit 28. The fluid connections may be formed of tubes, or if contained in a single housing, as passages or channels therethrough. The drain tube 38 protrudes through a seal 55 in the bladder 42 and is coupled between the bladder 42 and the first dual-purpose valve flow port 62a. The drain tube 58 protrudes through a seal 54 and is coupled between the bottom side 24d and the first dual-purpose valve flow port 62b. The first dual-purpose valve flow port 62c is connected to a pump inlet 66a by tube 64. The pump outlet 66b is connected to the second dual-purpose valve flow port 70a by tube 68. The second dual-purpose valve flow port 70b is connected to an exit circuit 28. The fluid exit tube 72 is coupled between the second dual-purpose valve flow port 70b and a nozzle 74. Although, only one nozzle is illustrated, multiple nozzles may be contemplated in an operational embodiment.

A fluid movement sensor 76, such as a pressure sensor or a flow rate sensor, is connected to the tube 68 via tube 69. The fluid movement sensor 76 measures the movement of the freezable washer liquid being pumped from the first reservoir 21. Of course, other types of movement sensors may be used. The first reservoir 21 may contain a first liquid level sensor 89 and the second reservoir 23 may contain a second liquid level sensor 91.

The fluid purge apparatus 61 includes a fluid passage tube 78, a gas/liquid separator 80, a fluid passage tube 82, and a vacuum tank 84. The gas/liquid separator 80 has an inlet 80a and two outlets 80b and 80c. The second dual-purpose valve flow port 70c is connected to the gas/liquid separator inlet 80a by fluid passage tube 78. The gas/liquid separator outlet 80b is connected to a vacuum tank 84 by fluid passage tube 82. The vacuum tank 84 draws washer liquid into the gas/liquid separator 80. The gas/liquid separator 80 dispenses the washer liquid drawn into it through the gas/liquid separator outlet 80c. The first dual-purpose valve 62, passage tube 64, pump 66, passage tube 68, the second dual-purpose valve 70 and the exit circuit 28 comprise the portion of the fluid distribution circuit 26 that is purged by the fluid purge apparatus 61. The fluid purge apparatus 61 also purges the fluid movement sensor 76.

An ECM 20 is used to electrically control the operation of the washer system 12. The ECM 20 is electrically coupled to, and receives electrical signals from, the fluid movement sensor 76, a temperature sensor 86, the liquid level sensor 89, the liquid level sensor 91 and the command switch 18. The temperature sensor 86 may be any of the following but is not limited to: a bi-metal thermostat switch, a solid state thermostat switch, a temperature gage, a thermocouple, a thermistor, or any other temperature measuring device. The ECM 20 is also electrically coupled to the first dual-purpose valve 62 and the second dual-purpose valve 70, the pump 66, the vacuum tank 84, and a warning light 87. The ECM 20, upon receiving signals from the fluid movement sensor 76, the temperature sensor 86, the liquid level sensor 89, the liquid level sensor 91 and the command switch 18, controls the first dual-purpose valve 62 and the second dual-purpose valve 70, the pump 66, the vacuum tank 84, and the warning light 87.

The ECM 20 monitors the last liquid used (either 40 or 48), the system mode (either "activate" or "deactivate"), the temperature sensor 86, the first liquid level sensor 89 and the second liquid level sensor 91. In FIG. 2, if the level of the liquid contained in either reservoir 21 or reservoir 23 is physically below the corresponding liquid level sensor, the ECM 20 activates a warning light 87 to warn the motorist that the corresponding liquid is running low. However, upon command, the ECM 20 may continue to draw liquid from reservoir 21 or reservoir 23 until either reservoir runs dry, depending on the temperature, as will be described later.

Figure 3:
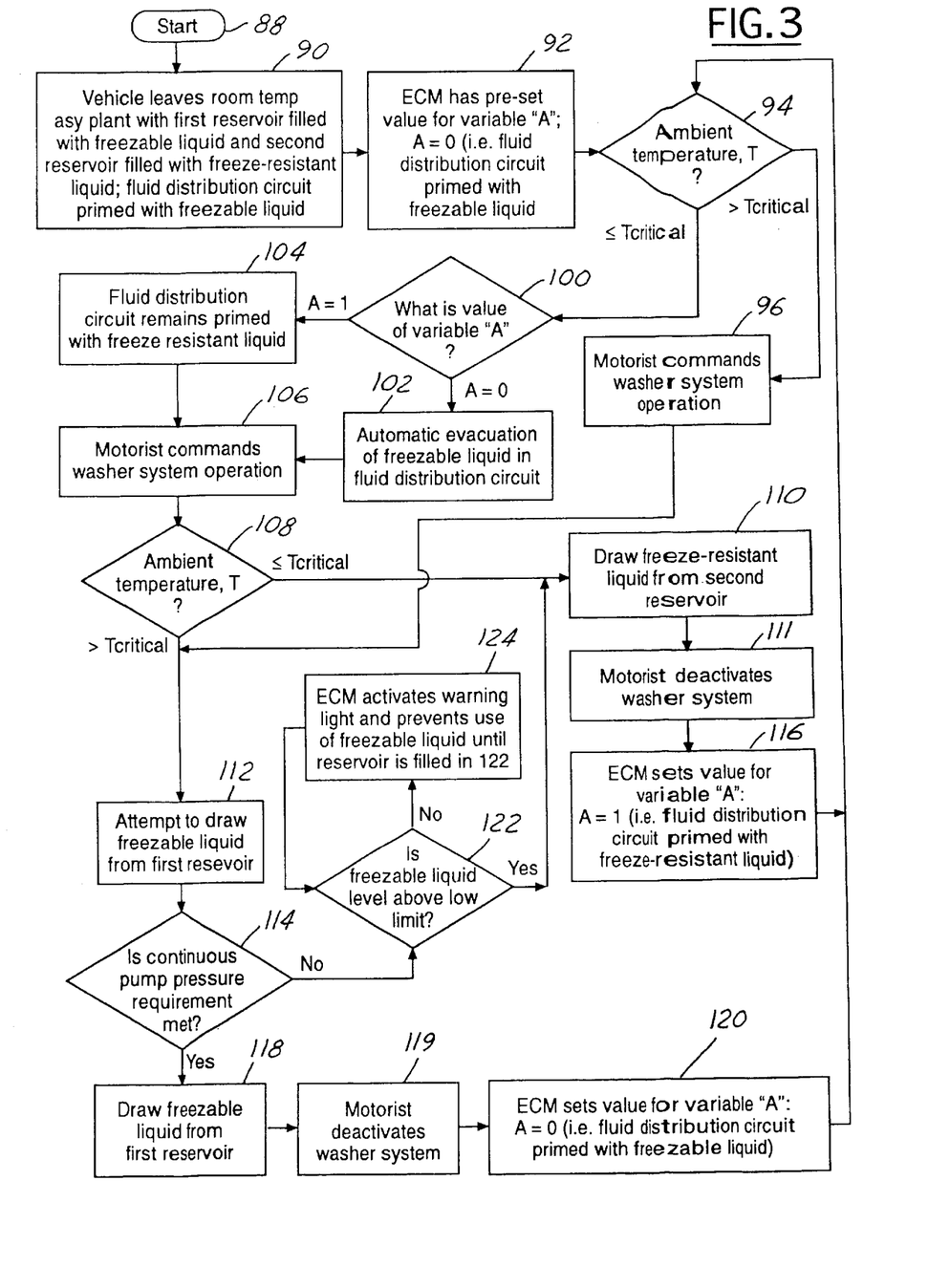
FIG. 3 is a flow chart illustrating a method, describing operation of the invention for the first washer system of FIG. 2.

Referring now to FIG. 3, the operation of the first embodiment of the first washer system 12 is best described in the flow chart shown. The operation is initialized in step 88.

In step 90, the first reservoir 21 and the second reservoir 23 are filled at the vehicle assembly plant, the first reservoir 21 with a freezable washer liquid 40, such as water or a solution of soap and water, and the second reservoir 23 with a freeze-resistant washer liquid 48, such as a solution of water, alcohol and soap. Prior to leaving the plant, the washer system 12 is operated to prime the washer pump 66 and exit circuit 28. To prime the pump 66, the command switch 18 is closed, where after the ECM 20 opens flow ports 62a and 62c of the first dual-purpose valve 62 and flow ports 70a and 70b of the second dual-purpose valve 70, and actuates the pump 66 to flow freezable washer liquid from the first reservoir 21 through pump 66 into the exit circuit 28.

In step 92, the ECM 20 operation liquid state variable "A" is set to a pre-set value of zero. The ECM 20 has two operating liquid states: A=0 representing that the prior liquid state was freezable washer liquid 40 or A=1 representing that the prior liquid state was freeze-resistant washer liquid 48.

In step 94, the ECM 20 determines the air temperature or the temperature of any relevant vehicle component, such as the windshield 14 via the temperature sensor 86. The temperature is compared to a critical temperature ($T_{critical}$), which in this case is set to 5° C. [41° F.]. The temperature $T_{critical}$ corresponds to the temperature where freezing of pure water may be possible, plus a safety factor. When the temperature is greater than $T_{critical}$ step 96 may be executed. When the ECM 20 determines the temperature is less than or equal to $T_{critical}$, step 100 is executed.

In step 96, when the system mode equals "activate", step 112 is executed. Step 112 and subsequent steps are discussed later.

In step 100, when the fluid distribution circuit 26 is primed with freezable washer liquid 40, operating state is A=0, step 102 is executed.

In step 102, at least a portion of the fluid distribution circuit 26 is purged. The purging of the freezable washer liquid 40 prevents the washer liquid from freezing in at least a portion of the fluid distribution circuit 26. To accomplish the purging of the fluid distribution circuit 26, the ECM 20 selectively opens the flow ports 62c and 62d between the atmosphere and the pump 66, the second dual-purpose valve flow ports 70a, 70b and 70c between the pump 66, the exit circuit 28, and the gas/liquid separator 80. This allows the vacuum tank 84 in the purging apparatus 61 to draw all the fluid contained within a portion of the fluid distribution circuit 26 into the gas/liquid separator 80 so the distribution circuit is effectively drained, at which time the aforementioned valve flow ports are closed by the ECM 20.

Referring back to step 100 above, if on the other hand the fluid distribution circuit 26 contains freeze-resistant washer liquid 48 (A=1), then step 104 is executed.

In step 104, the fluid distribution circuit 26 remains primed with freeze-resistant washer liquid 48. Upon finishing either step 102 or step 104, step 106 may be executed.

In step 106, when the system mode equals "activate" step 108 is executed.

In step 108, when the temperature is less than or equal to $T_{critical}$ step 110 is executed.

In step 110, the ECM 20 upon receiving the temperature signal automatically uses the freeze-resistant washer liquid 48 from the second reservoir 23 since the previous liquid usage state was A=1. To draw freeze-resistant washer liquid, the ECM 20, only while receiving a command signal from command switch 18 in step 106, opens flow ports 62b, 62c, 70a, and 70b while simultaneously energizing pump 66. Upon system deactivation in step 111, step 116 is executed.

In step 116, A is reset to A=1, after which the ECM function returns to step 94. When the temperature remains at or below the freezing point of water (0° C.) for extended periods of time, some or all of the freezable washer liquid 40 in the first reservoir 21 may solidify.

In step 108, when the temperature becomes greater than $T_{critical}$ step 112 is executed.

In step 112, the ECM 20 attempts to draw freezable washer liquid 40 from the first reservoir 21 and then executes step 114.

In step 114, as long as the ECM 20 senses, via the fluid movement sensor 76, a fluid pressure downstream of pump 66 that is within a pre-selected pressure range $P_{Critical}$ (or flow rate within a pre-selected range $F_{critical}$) then step 118 is executed. In this example a pressure sensor is used in place of the fluid movement sensor 76.

In step 118, the ECM 20 draws freezable washer liquid 40 from the first reservoir 21 until the system mode equals "deactivate" in step 119, at which time step 120 is executed.

In step 120, liquid state variable A is reset to A=0 and distribution circuit 26 is primed with freezable washer liquid 40. Upon completion of step 120, the ECM 20 function returns to step 94.

In step 114, as long as the ECM 20 receives a signal from the fluid movement sensor 76 that is not within a pre-selected pressure range $P_{critical}$ (or flow rate range $F_{critical}$) which may occur when some or all of the freezable washer liquid 40 in the first reservoir 21 has solidified into ice 46, step 122 is executed. In step 122, the ECM 20 checks the liquid and solid (if any) level in the first reservoir 21 via liquid level sensor 89. When the level is above a predetermined low limit level, step 110 is executed. The ECM 20 reverts to step 110 to draw freeze-resistant washer liquid 48 from the second reservoir 23. If the system mode returns to "deactivate" in step 111 (command switch 18 is opened), then step 116 is executed. In step 116, the ECM 20 resets liquid state variable A to A=1 and returns to step 94.

In step 122, when the freezable washer liquid 40 and/or ice 46 in the first reservoir 21 is at or below the predetermined low limit level as determined by liquid level sensor 89, step 124 is executed.

In step 124, the ECM 20 activates the warning lamp 87 and simultaneously prevents the operation of the pump 66 until the first reservoir 21 is filled above the predetermined low limit level, as determined in step 122. Thus, when the temperature is above $T_{critical}$, the washer system will preferably only draw freeze-resistant washer liquid 48 from the second reservoir 23 if the level of the freezable washer liquid 40 in the first reservoir 21 is above the low limit level and the signal from the fluid movement sensor 76 is not within a pre-selected pressure range $P_{critical}$.

After the washer system 12 leaves the plant a variety of temperatures may be encountered. As such, when the system mode equals "activate" the automatic use of liquid from either the first reservoir 21 or the second reservoir 23 is based on the temperature signal received. When the temperature remains above $T_{critical}$, freezable washer liquid 40 may continue to be drawn from the first reservoir 21. When the temperature remains at or below $T_{critical}$ then the freeze resistant washer liquid 48 may continue to be drawn from the second reservoir 23. Whenever the washer system 12 is deactivated (command switch 18 is opened) the ECM 20 closes all possible flow paths by closing all of the flow ports in the first dual-purpose valve 62 and the second dual-purpose valve 70, thus preventing fluid contained in the fluid distribution circuit 26 from draining into the first or second reservoir by gravity.

Figure 4:
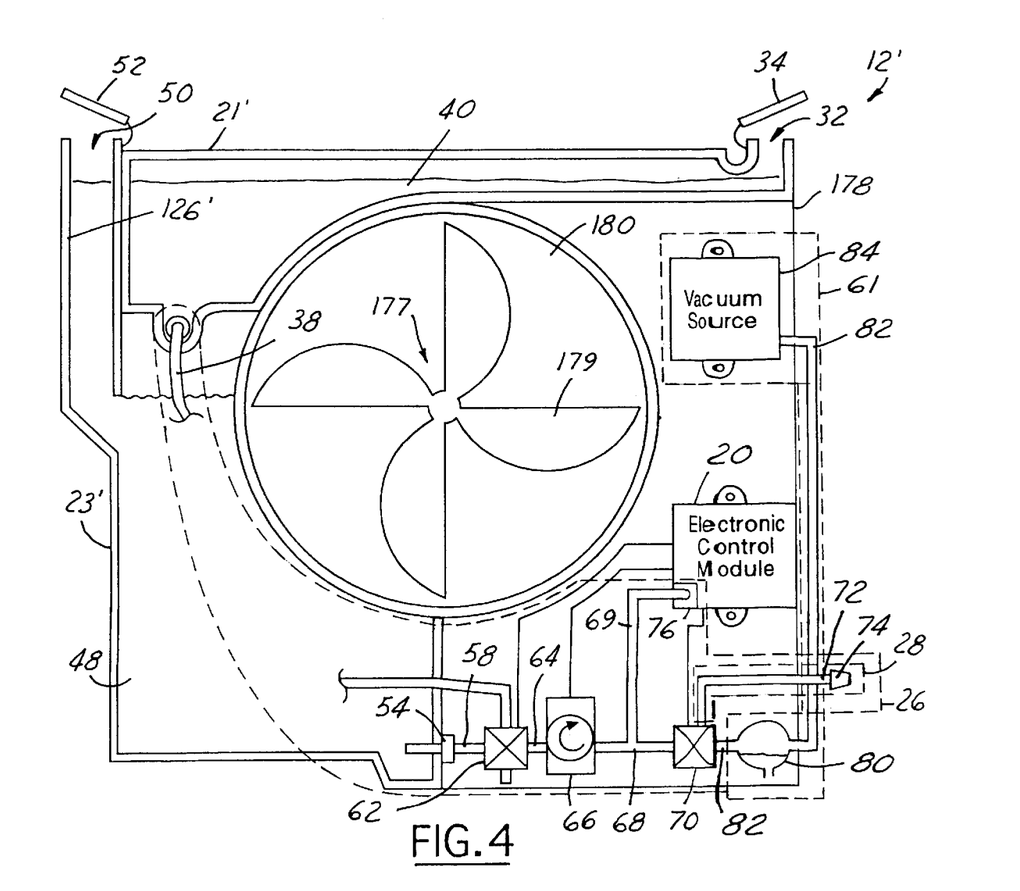
FIG. 4 is a schematic view of the second washer system according to the preferred embodiment.
Figure 5:
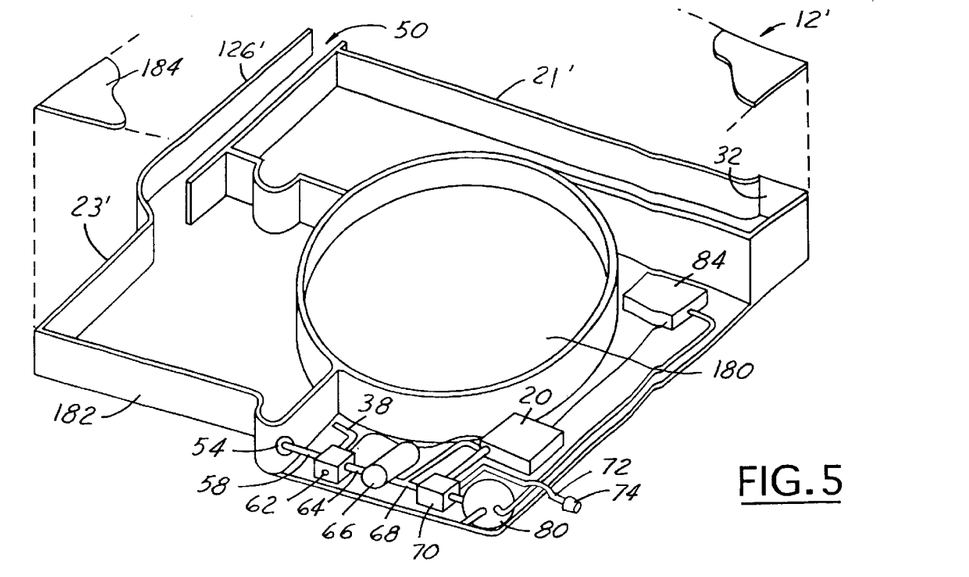
FIG. 5 is a perspective view of the second washer system in FIG. 4.

Referring now to FIGS. 4 and 5, at least a portion of washer system 12 may be incorporated into a vehicle engine-cooling fan shroud 178 to form washer system 12'. Washer system 12' reduces costs, reduces the number of vehicle components, and utilizes space available in vehicle 10. The first reservoir 21' has a filler hole 32 with a removable lid 34 at the top of the fan shroud 178. The second reservoir 23' has a filler neck 126' with a filler hole 50 and removable lid 52 at the top of the fan shroud 178. Reservoirs 21' and 23' form a hole 180 in the center 177 of the fan shroud 178. The vehicle engine-cooling fan 179 rotates inside hole 180 in the center of the fan shroud 178. To simplify the installation of an expandable bladder 42 and the isolation foam 44 (not shown) in the first reservoir 21', it would be most practical to assemble the fan shroud 178 from two halves as best shown in FIG. 5 showing a first half 182 and a second half 184.

Figure 6A:
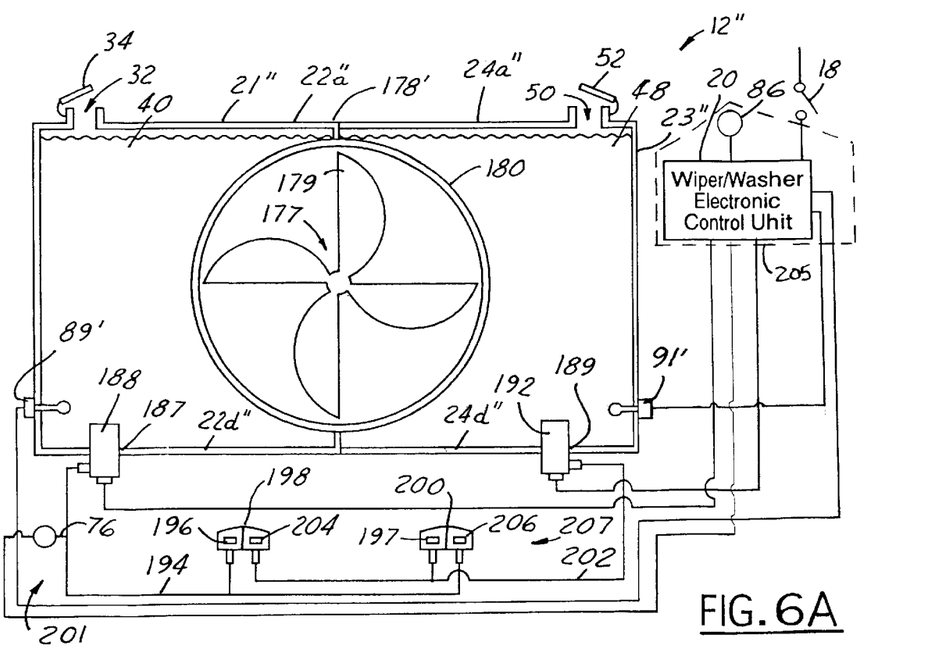
FIG. 6A is a schematic view of the third washer system according to the preferred embodiment.

Referring now to FIG. 6A, a third embodiment of the present invention illustrating washer system 12", whereby the purging method described in the first and second embodiments is not utilized while maintaining a freeze resilient system. Preferably, the first reservoir 21" and the second reservoir 23" are incorporated into a fan shroud 178'. The first reservoir 21" contains a freezable washer liquid 40. The first reservoir 21" is designed to allow the freezable washer liquid to expand. The first reservoir 21' may be produced from a freeze resilient plastic or may contain an expandable bladder 42 at least partially surrounded by foam 44 (neither shown) which protects the reservoir 21" in case freezable washer liquid 40 solidifies and undergoes a 10% expansion by volume. The first reservoir 21" also has a filling hole 32 in the top side 22a" with a removable lid 34 to close the filling hole 32. The bottom side 22d" has a first outlet 187 to which a first pump 188 may be connected.

The second reservoir 23" contains a freeze-resistant washer liquid 48. The second reservoir 23" also has a filling hole 50 in the top side 24a" with a lid 52. The bottom side 24d" has a second outlet 189 to which a second pump 192 may be connected.

The first pump 188 is connected to a first hose assembly 194. The first hose assembly 194 is also connected to a first port 196 of a first nozzle 198 and a first port 206 of a second nozzle 200. The first washer liquid path 201 comprises the first reservoir 21", the first pump 188, the first hose assembly 194, the first port 196 of the first nozzle 198, and the first port 206 of a second nozzle 200. The second pump 192 is connected to a second hose assembly 202. The second hose assembly 202 is also connected to a second port 204 of the first nozzle 198 and a second port 197 of the second nozzle 200. The first hose assembly 194 and the second hose assembly 202 may be produced from elastomeric or polymeric materials capable of withstanding 10% volume expansions, in the event that the liquids in the hose assemblies freeze. The second washer liquid path 207 comprises the second reservoir 23", the second pump 192, the second hose assembly 202, the second port 204 of the first nozzle 198, and the second port 197 of the second nozzle 200. The first washer liquid path 201 is parallel to the second washer liquid path 207. A temperature sensor 86 generates a temperature signal. A fluid movement sensor 76 generates a pressure signal (or flow rate signal). Liquid level sensors 89' and 91' generate liquid level signals for the first reservoir 21" and the second reservoir 23", respectively. The first pump 188, the second pump 192, the temperature sensor 86, the fluid movement sensor 76 and the liquid level sensors 89' and 91' are electrically coupled to an electrical control circuit 205 comprising the ECM 20 and the temperature sensor 86. The electronic control circuit 205 may comprise: a microprocessor, a thermostat switch, a temperature sensor, or other electronic device that may be used to measure temperature or switch between said first washer liquid path 201 and second washer liquid path 207.

At least a portion of washer system 12" is preferably incorporated into a fan shroud 178'. The cross-sectional area of the fan shroud 178' is divided into a first portion and a second portion. The first portion is the first reservoir 21", the second portion is the second reservoir 23". An opening 180 is in the center 177 of the cross-sectional area of the fan shroud 178'. The engine-cooling fan 179 rotates within the opening 180.

In operation, the ECM 20 actuates the first pump 188 if and only if the current system mode equals "activate" corresponding to the ECM 20 receiving a signal from the command switch 18, the temperature (sensed by temperature sensor 86) is greater than $T_{critical}$, and the pressure downstream of the pump 188 (sensed by movement sensor 76) is within a pre-selected pressure range $P_{critical}$. The temperature $T_{critical}$ corresponds to a temperature below which pure water will solidify, plus a safety factor. During the time when the ECM 20 is activating the first pump the ECM 20 does not actuate the second pump 192. Actuating the first pump 188 causes washer liquid in the first reservoir 21" to be pumped through the first hose assembly 194 and dispensed out of port 196 and port 206 onto the windshield 14.

The ECM 20 actuates the second pump 192 and at the same time does not actuate the first pump 188 if the system mode equals "activate" and the temperature is less than or equal to $T_{critical}$. Actuating the second pump 192 causes freeze-resistant washer liquid 48 in the second reservoir 23" to be pumped through the second hose assembly 202 and dispensed out port 204 and port 197 onto the windshield 14. In addition, the ECM 20 will actuate the second pump 192 and at the same time not actuate the first pump 188 if the system mode equals "activate", the temperature is greater than $T_{critical}$, the washer liquid level in the first reservoir 21" is higher than the predetermined low limit level as defined by the position of the level sensor 89' and the pressure sensed by fluid movement sensor 76 is not within a preselected pressure range $P_{critical}$. Finally, even when the system mode equals "activate" and the temperature is greater than $T_{critical}$, the ECM 20 will not actuate the first pump 188 or the second pump 192 when the washer liquid level in the first reservoir 21" is at or below the predetermined low limit level as defined by the position of liquid level sensor 89' and the pressure sensed by the fluid movement sensor 76 is not within a pre-selected pressure range $P_{critical}$.

Referring now to FIG. 6B, costs to produce washer system 12" may be reduced by eliminating the liquid level sensors 89' and 91', the liquid movement sensor 76, the temperature sensor 86 and the ECM 20. In replacement of temperature sensor 86 and ECM 20, a bimetal or solid state thermostat switch 208 is used to sense temperature and selectively directs the command signal from command switch 18 to either pump 188 or pump 192, depending on the position of the thermostat switch 208, which is a direct function of the temperature and the thermostat set point. The thermostat switch 208 set point is equal to $T_{critical}$, where $T_{critical}$ is predetermined, preferably set in the range of 10° C. to 21° C. When the temperature sensed by the thermostat switch 208 is above $T_{critical}$, the command signal will be directed to pump 188 via the thermostat switch 208. When the temperature sensed by the thermostat switch 208 is equal to or less than $T_{critical}$, the command signal is directed to pump 192 via the thermostat switch 208. The temperature $T_{critical}$ corresponds to the temperature where the freezing of pure water will occur (0° C.), plus a safety factor preferably ranging from 10° C. to 21° C. The safety factor improves the likelihood that all of the freezable washer liquid 40 in the first reservoir 21" and in the first washer liquid path 201 will be completely liquid (none in solid form, so as to block liquid flow) at any time the first pump 188 is actuated, thus ensuring the desired function.

The above described washer systems, to one skilled in the art, are capable of being adapted for various purposes and are not limited to the following automotive applications: a windshield washer system, a head lamp or tail lamp washer system, and a washer system for the rear window in a vehicle. The above-described invention can also be varied without deviating from the true scope of the invention.

What is claimed is:

1. A washer system comprising:
   a first reservoir containing a freezable washer liquid;
   a second reservoir containing a freeze-resistant washer liquid;
   an exit circuit;
   a fluid distribution circuit fluidically coupling said first reservoir, said second reservoir, and said exit circuit;
   a fluid purge apparatus fluidically coupled to said fluid distribution circuit;
   a temperature sensor generating a temperature signal; and
   an electrical control module (ECM) electrically coupled to said fluid distribution circuit, said fluid purge apparatus, and said temperature sensor, said ECM controlling said fluid purge apparatus to purge said freezable washer liquid from at least a portion of said fluid distribution circuit and said exit circuit in response to said temperature signal.

2. A system as claimed in claim 1 wherein said fluid purge apparatus comprises:
   a gas/liquid separator fluidically coupled to said fluid distribution circuit;
   a vacuum tank fluidically coupled to said gas/liquid separator and electrically coupled to said ECM;
   said ECM controlling said vacuum tank to draw said freezable washer liquid from at least a portion of said fluid distribution circuit and said exit circuit into said gas/liquid separator in response to said temperature signal.

3. A system as claimed in claim 2 wherein said fluid distribution circuit comprises:
   a first dual purpose valve fluidically coupled to said first reservoir and said second reservoir and electrically coupled to said ECM;
   a pump fluidically coupled to said first dual-purpose valve and electrically coupled to said ECM;
   a second dual-purpose valve fluidically coupled to said pump, said exit circuit, said second reservoir, and said gas/liquid separator;
   said ECM controlling said first dual-purpose valve, said pump, and said second dual-purpose valve in response to said temperature signal.

4. A system as claimed in claim 3 wherein said ECM controls said first dual-purpose valve, said second dual-purpose valve, and said vacuum tank to draw air into said first dual purpose valve and said exit circuit causing said freezable washer liquid in said fluid distribution circuit and said exit circuit to enter said gas/liquid separator.

5. A system as claimed in claim 3 wherein said ECM opens said second dual-purpose valve, said first dual-purpose valve, and actuates said pump, causing said freezable washer liquid in said first reservoir to be dispensed through said exit circuit upon receiving said temperature signal that is greater than a predetermined temperature.

6. A system as claimed in claim 3 wherein said ECM opens said second dual-purpose valve, said first dual-purpose valve, and actuates said pump causing said freeze-resistant fluid in said second reservoir to be dispensed through said exit circuit upon receiving said temperature signal that is less than or equal to a predetermined temperature.

7. A system as claimed in claim 3 further comprising:
a fluid movement sensor fluidically coupled to said pump and electrically coupled to said ECM;
said fluid movement sensor generates a fluid pressure signal;
said ECM controls said fluid distribution circuit in response to said fluid pressure signal.

8. A system as claimed in claim 7:
wherein said ECM determines a prior liquid state having a first state and a second state, first state corresponding to a prior distribution of said freezable washer liquid and second state corresponding to a prior distribution of a freeze-resistant washer liquid.

9. A system as claimed in claim 7 wherein said ECM opens said second dual-purpose valve between said pump, said gas/liquid separator, and said exit circuit, opens said first dual-purpose valve between the atmosphere and said pump allowing said vacuum tank to draw air from the atmosphere causing said freezable washer liquid in said fluid distribution circuit to enter said gas/liquid separator in response to said air temperature signal being less than a predetermined temperature and prior liquid state being in said first state.

10. A system as claimed in claim 8 wherein said ECM determines not to purge said fluid distribution circuit when prior liquid state is in said second state.

11. A system as claimed in claim 1 further comprising a fan shroud, said first reservoir and said second reservoir at least partially incorporated into said fan shroud.

12. A system as claimed in claim 1 wherein said first reservoir comprises an expandable bladder at least partially surrounded by foam.

13. A system as claimed in claim 1 wherein said fluid exit circuit comprises:
an exit tube fluidically coupled to said second dual-purpose valve; and
a nozzle fluidically coupled to said exit tube.

14. A system as claimed in claim 9 further comprising:
a first dual-purpose valve fluidically coupled to said first reservoir, said second reservoir, and said pump;
said second dual-purpose valve fluidically coupled to said second reservoir, said pump, said gas/liquid separator, and said nozzle;
said second dual-purpose valve and said first dual-purpose valve are controlled by said ECM in response to said temperature signal.

15. A washer system comprising:
a first reservoir containing a freezable washer liquid;
a second reservoir containing a freeze-resistant washer liquid;
an exit circuit;
a fluid distribution circuit having a pump, said fluid distribution circuit fluidically coupling said first reservoir, said second reservoir, and said exit circuit;
a temperature sensor generating a temperature signal; and
an electrical control module (ECM) electrically coupled to said fluid distribution circuit and said temperature sensor, said ECM controlling said pump to pump freezable washer liquid or freeze-resistant washer liquid from said first reservoir or said second reservoir to said exit circuit in response to said temperature signal.

16. A system as claimed in claim 15 further comprising a purge apparatus fluidically coupled to said fluid distribution circuit wherein said ECM controlling said fluid purge apparatus to purge said freezable washer liquid from at least a portion of said fluid distribution circuit.

17. A method of operating a washer system having a first reservoir containing a freezable washer liquid, a second reservoir containing a freeze-resistant washer liquid, and a fluid purge apparatus, comprising the steps of:
determining a temperature; and
purging said freezable washer liquid from at least a portion of a fluid distribution circuit in response to said temperature.

18. A method as in claim 17 wherein the step of purging a portion of a fluid distribution circuit having a first dual-purpose valve, a second dual-purpose valve, and a vacuum tank further comprises the steps of:
controlling said first dual-purpose valve, said second dual-purpose valve, and said vacuum tank in response to said temperature; and
drawing air or said freezable washer liquid from at least a portion of said fluid distribution circuit into a gas/liquid separator.

19. A method as in claim 17 wherein the step of purging said fluid distribution circuit comprises the step of purging at least a portion of a first dual-purpose valve, a pump, a second dual-purpose valve, and an exit circuit.

20. A method as in claim 17 wherein the step of purging comprises the steps of:
controlling a first dual-purpose valve and a second dual-purpose valve;
drawing air or said freezable washer liquid into a gas/liquid separator from said first dual-purpose valve, said pump, said second dual-purpose valve, and said exit circuit upon said ECM receiving said temperature signal.

21. A method of operating a washer system, comprising the steps of:
determining a temperature;
determining a freezable washer liquid pressure;
drawing said freezable washer liquid from a first reservoir when said temperature is greater than a predetermined temperature and said fluid pressure is within a predetermined fluid pressure range;
drawing a freeze-resistant washer liquid from a second reservoir when said temperature is less than or equal to a predetermined temperature; and
drawing a freeze-resistant washer liquid from a second reservoir when said temperature is greater than a predetermined temperature and said fluid pressure is outside a predetermined fluid pressure range.

22. A method as in claim 21, further comprising the step of purging at least a portion of a fluid distribution circuit and a fluid exit circuit in response to a temperature signal.

23. A method as in claim 21, further comprising the steps of:

determining a prior fluid state having a first state and a second state, first state indicating a distribution of said freezable washer liquid and second state indicating a distribution of said freeze-resistant washer liquid;

purging at least a portion of a fluid distribution circuit and a fluid exit circuit in response to a temperature signal and said prior fluid state equal to said first state.

24. A method as in claim 22 wherein the step of purging said fluid distribution circuit comprises the step of purging at least a portion of a first dual-purpose valve, a pump, a second dual-purpose valve, and an exit circuit.

25. A method as in claim 22 wherein the step of purging comprises the step of purging at least a portion of an exit tube and a nozzle.

26. A method as in claim 22, wherein the step of purging comprises the step of activating a vacuum tank to purge fluid in said fluid distribution circuit into a gas/liquid separator.

27. A method as in claim 22, wherein the step of purging comprises the steps of:

opening a first dual-purpose valve and a second dual-purpose valve;

drawing air or said freezable washer liquid into a gas/liquid separator from said first dual-purpose valve, said pump, said second dual-purpose valve, and said exit circuit upon said ECM receiving said temperature signal.

* * * * *